Jan. 13, 1942. E. D. TILLYER 2,269,494
HEAT RETARDING DEVICE AND METHOD OF MAKING THE SAME
Filed Dec. 24, 1938
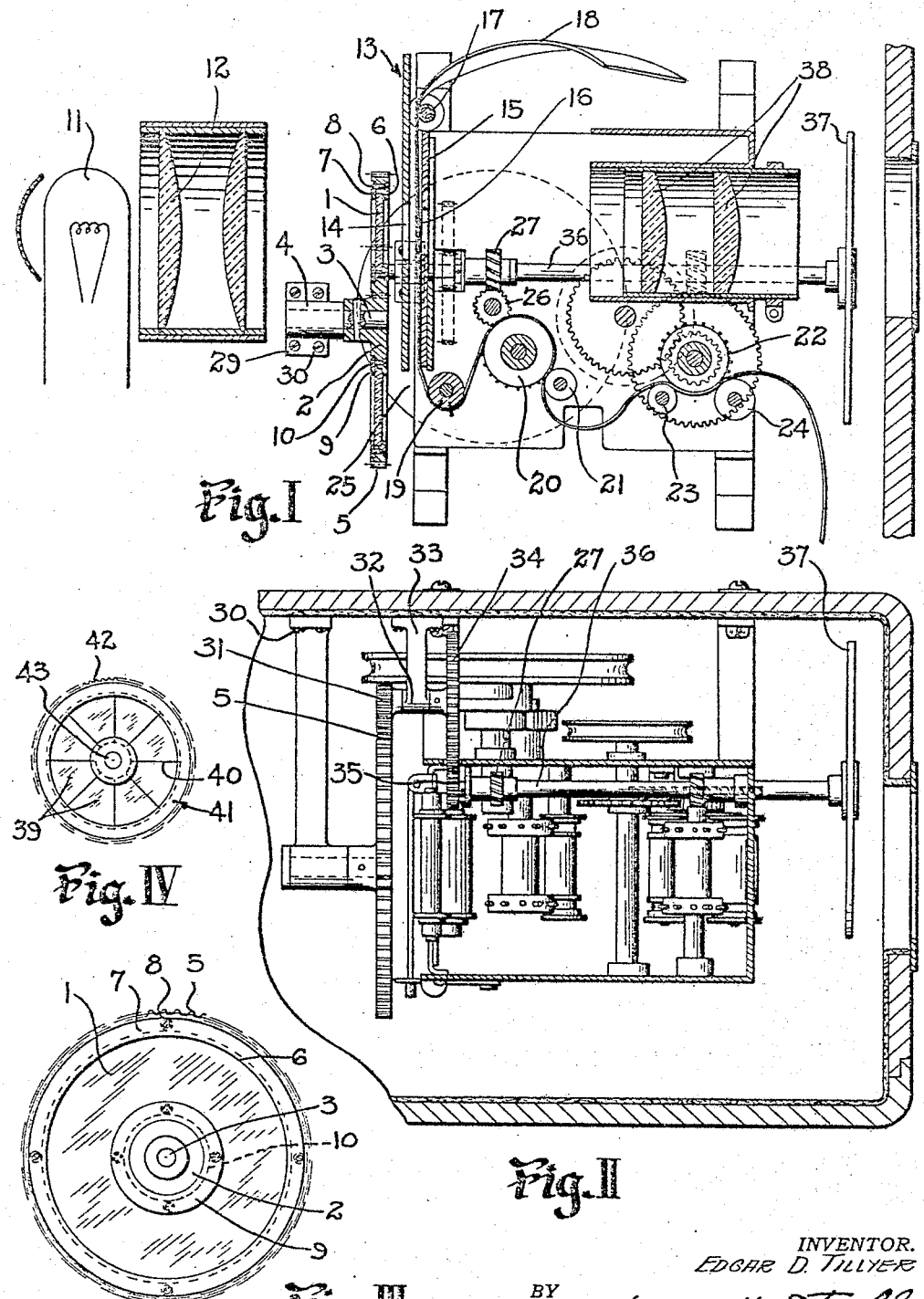
INVENTOR.
EDGAR D. TILLYER
BY Harry H. Styll
ATTORNEY.

Patented Jan. 13, 1942

2,269,494

UNITED STATES PATENT OFFICE 2,269,494

HEAT RETARDING DEVICE AND METHOD OF MAKING THE SAME

Edgar D. Tillyer, Southbridge, Mass., assignor to American Optical Company, Southbridge, Mass., a voluntary association of Massachusetts Application December 24, 1938, Serial No. 247,718

6 Claims. (Cl. 88—24)

This invention relates to improvements in illuminating and projection apparatus and has particular reference to improved means and method of forming a heat protection screen for the films or slides used with such apparatus.

One of the principal objects of the invention is to provide improved means and method of forming a heat screen of transparent material which will transmit a high percentage of the visible rays and reduce or eliminate the transmission of the invisible or infra-red rays so as to protect the delicate films or slides used with such apparatus and which is so supported and correlated with the apparatus as to be protected against cracking or breaking which might be brought about by the intense heat of the projected light rays.

Another object of the invention is to provide improved means and method of forming and supporting a substantially colorless heat screen of vitreous composition which will have a high transmission of visible light and which will greatly reduce or eliminate the transmission of invisible light, particularly throughout the infra-red range, so that the effective portion of said heat screen will not be continuously exposed to the heat of the projected rays of the projection apparatus with which such screen is being used.

Another object is to provide means of avoiding heat shock in vitreous screens substantially free from silica and containing at least 60% of phosphorus expressed as $P_2O_5$ and having an infra-red absorbing ingredient therein and method of supporting said heat screen in effective operative position whereby the said heat screen may be rotated to position different portions thereof in the path of the projected light rays of a projection apparatus with which said vitreous screens are being used so as to render the said screens more resistant to cracking or breaking when acted upon by heat of said rays.

Other objects and advantages of the invention should become apparent from the following description taken in connection with the accompanying drawing and it will be apparent that many modifications and departures may be made from the specific features and methods disclosed herein without departing from the spirit of the invention as expressed in the accompanying claims. I, therefore, do not wish to be limited to the specific details of construction, arrangement of parts and methods shown and described as the preferred forms only have been given by way of illustration.

Referring to the drawing:

Fig. I is a diagrammatic longitudinal side-sectional view through a projection apparatus showing the device embodying the invention in operative relation with said projection apparatus;

Fig. II is a sectional plan view looking down on the operative mechanism of the apparatus and of the said device embodying the invention;

Fig. III is a side elevation of the heat screen embodying the invention; and

Fig. IV is a view generally similar to Fig. III showing a modified form of heat screen.

It is well known that the powerful illumination required in a projection apparatus generates intense infra-red radiations.

Many different devices have been used for protecting the films or slides used with such apparatus from such heat with a view to preventing ignition, heat blistering and so forth. Most of these prior art devices, although efficient as regards the absorption of the invisible or infra-red heat rays, also greatly reduced the visible rays and also changed the color thereof. This change of color and reduction of the visible rays was an inherent function of most prior art heat retarding vitreous screens and rendered it desirable, so as to make such heat protection devices practical for use in projecting colored pictures, by the use of slides having differently colored pigments thereon, to eliminate if possible such large reductions of the visible rays and altering of the colors in devices of this character and yet avoid having said devices subjected to the danger of possible cracking and breaking which might result from the intense heat of the projected rays intercepted thereby. The present invention, therefore, is directed particularly to the provision of heat screen means which has all of the desirable characteristics of the prior art devices, as regards the absorption of the infra-red or heat rays, with the elimination of the undesirable loss in the transmission of and the change of color of the visible rays and which also possesses characteristics which will protect the said screen against becoming overheated and the danger of becoming cracked or broken during use.

Referring more particularly to the drawing wherein like characters of reference designate like parts throughout the several views the device embodying the invention, as illustrated in Figs. I and III, comprises an annular transparent vitreous screen 1 mounted centrally thereof in a plate-like holder 2 rotatably supported on a shaft 3 in a bearing 4. A ring coil 5 having a shouldered portion 6 is fitted about the outer contour edge of the screen member 1 and is held thereon by a ring 7 attached to said annular member by screws or the like means 8. The annular screen 1 is secured to the plate-like holder 2 by a ring 9, similar to the ring 7 but of smaller diameter, through screws or the like means 10.

The heat screen 1 is formed of a transparent medium having substantially colorless characteristics which will transmit a high percentage of the visible rays and possesses means which will reduce or eliminate the transmission of the invisible or infra-red rays. A screen having these characteristics may be formed of a vitreous composition whose analysis may be expressed as follows: $P_2O_5$—52 to 77%; material from the group consisting of CaO, BaO, SrO—0.1 to 12%; material from the group consisting of $K_2O$, $Na_2O$, $Li_2O$—0.1 to 10% and material from the group consisting of $Al_2O_3$, BeO and mixtures of $Al_2O_3$ and BeO—5 to 20%; $Fe_3(PO_4)_2 \cdot 8H_2O$—1 to 10% or by the use of a vitreous material, for example, whose chemical analysis may be expressed as:

| | Percent |
|---|---|
| $P_2O_5$ | 73.40 |
| $Al_2O_3$ | 10.89 |
| $Fe_2O_3$ | 2.04 |
| MgO | 4.74 |
| BaO | 3.42 |
| $B_2O_3$ | 4.34 |
| $SiO_2$ | 0.33 |
| $Na_2O$ | 0.38 |

The material resulting from the above compositions is reduced to a desired size and thickness and to the contour shape desired. This may be accomplished by surfacing the opposite sides of the material with a suitable abrasive such as emery, rouge and so forth for producing the surface texture desired. The heat screen may be formed to the desired size and shape by cutting and edging the said material by means and methods employed in the art of manufacturing lenses.

It is particularly desirable that the vitreous materials used in forming said heat screens be substantially free from silica and that they contain at least 50% of phosphorus expressed as $P_2O_5$ and that they contain an infra-red absorbing ingredient such as iron in the ferrous condition. This produces a vitreous material which will be relatively clear and transparent and which possesses the desirable infra-red absorbing characteristics.

The screen or lens formed of material whose analysis may be expressed as: $P_2O_5$; material from the group consisting of CaO, BaO, SrO; material from the group consisting of $K_2O$, $Na_2O$, $Li_2O$; material from the group consisting of $Al_2O_3$, BeO and mixtures of $Al_2O_3$ and BeO; and $Fe_3(PO_4)_2 \cdot 8H_2O$, will be substantially colorless and will have the desired infra-red absorbing characteristics. The screen, therefore, while absorbing the infra-red or heat rays, will have an exceptionally high transmission of the visible rays. Most prior art heat screens of this character had from 40 to 50% transmission, while the screen embodying the invention, as formed of the vitreous material described above, will have from 85 to 90% transmission. It is apparent, therefore, that the change in intensity of the light, as brought about by the heat screen embodying the invention will be much less than that of the prior art heat screens mentioned above and will be substantially unnoticeable to the human eye.

The vitreous material whose chemical analysis is expressed as $P_2O_5$, $Al_2O_3$, $Fe_2O_3$, MgO, BaO, $B_2O_3$, $SiO_2$ and $Na_2O$ will have some color but will transmit much more of the visible rays than most prior art heat screens.

The vitreous materials disclosed herein are resistant to weathering, acids and to discoloring, particularly when acted upon by radiation.

It is to be understood that the coefficient of expansion, of applicant's vitreous material, may be modified to render the said materials more resistant to heat and heat shock. This may be accomplished by altering the percentages of $Al_2O_3$, BeO and so forth to obtain the results desired.

Heat screens of the character described may be used with either still pictures or moving pictures such as diagrammatically illustrated in the drawing. In instances wherein said heat screens are used with still pictures the said screens may be operated by a separate source of power, such as by a motor or other means, as may also be done in the case of motion pictures, if desired.

Although applicant has diagrammatically illustrated one form of motion picture projector it is to be understood that many different types of projectors may be used and that this illustration is only for the purpose of showing how applicant's heat screen could be applied to a motion picture projector.

The projector in this particular instance, as shown in Figs. I and II, comprises a source of illumination 11 having a condensing lens system 12 positioned in the path of the light rays coming from said source. A support 13 having a framing opening 14 therein is also aligned with said projected light rays. The support 13 has a spaced member 15 also provided with an opening 16 simulating the opening 14 in alignment with said opening. The said openings 14 and 16 are substantially co-axial with the axes of the projection of the condensing lens system 12. The support 13 is provided with a suitable roller 17 over which the film 18 is fed downwardly between the spaced support members 13 and 15 and over a receiving roller 19. The film then progresses over a series of sprocket enrolled members 20, 21, 22, 23 and 24, etc., from which it is then directed to a suitable pick-up roll not shown. This construction is of a conventional type projector. The sprockets and various roll members spaced above are operated in the usual manner through suitable operating means.

The heat screen 1, as illustrated in Fig. I, is supported for rotation about an axis 3, preferably substantially parallel with the axis of projection of the light from the light source 11, so as to intercept the light rays coming from the light source 2 through the condensing lenses 12 prior to the said rays passing through the framing openings 14 and 16 and the film located therebetween. As stated above the heat screen is of an annular form and is supported for rotation about an axis 3 substantially parallel with the axis of the projected light. The said screen 1 is continuously rotated during use so that different portions thereof continuously move into and out of intercepting position. This prevents the screen from being excessively heated and also allows heated portions thereof to cool during rotation. The screen is rotatably carried by a bracket 29 pivotally secured to the side of the casing of the projector by means of screws or the like 30. The outer ring gear 5 of said screen is operated through a small gear 31 mounted on a shaft rotated in the bearing 32 of another bracket 33 secured to the wall in the casing of the projector and having a drive gear 34 adjacent the opposed end thereof. The said drive gear 34 is connected with a coil 35 mounted on a shaft 36 carrying a shutter 37. The shaft 36 is operated by bevelled gears 26 and 27 driven by means of a suitable pulley 25. These latter parts are standard equipment of the projector and the said pulley 25 is operated through a belt connection with a suitable motor which drives the operating mechanism of the projector. The said projector also has the usual projection lens system 38 by means of which the light rays of the projector and image formed by the film is projected on a suitable receiving screen. It is to be understood, of course, that the film is intermittently advanced as is usual in film projectors. In this particular instance, the heat screen 1 is driven through a gear connection with a portion of the standard operating equipment of the projector, but it is to be understood that the said screen may be rotated by a separate motor through a standard reduction gear, if desired; particularly in instances when it is used with still projectors.

Although applicant has shown a screen intergeared with one particular part of the operating part of the mechanism it is to be understood that it may be intergeared with any desirable part of the projector. The device may be in the form of a separate attachment made for ready application to any projector or may be formed as an integral part thereof.

It is also to be understood that instead of forming the screen from a single piece of vitreous material, as illustrated in Fig. III, the said screen, as shown in Fig. IV, may be formed of a plurality of segments 39 joined in edge to edge relation with each other, as illustrated at 40, in a suitable frame support 41 simulating the construction of the screen support means illustrated in Fig. III.

The screens embodying the invention have been shown and described as being continuously rotated. It is to be understood that they may be interconnected with the intermittently operating portion with the mechanism of the projector so that, in instances wherein a screen such as illustrated in Fig. IV is used, the segments may be intermittently advanced into position of use. This intermittent advancing may be also applied to a heat screen, such as illustrated in Fig. III, if desired. It is to be understood, therefore, that the heat screens may be continuously or intermittently advanced.

The screen illustrated in Fig. IV may also be continuously rotated, if desired. The speed of rotation would, in all probability, be more rapid than that required for rotation of the screen illustrated in Fig. III.

The construction, illustrated in Fig. IV, enables smaller segments of vitreous material to be used in forming the screen.

When mounting a screen, such as illustrated in Fig. IV, for intermittent movement it is preferably interconnected with the mechanism for intermittently advancing the film and for intermittently exposing and blanking out said film. The screen may be provided with a peripheral gear 42 or may be mounted on a shaft 43 connected with the intermittently operating mechanism of the projector. It is also to be understood that this screen, as well as the screen in Fig. III, may be operated by separate operating mechanism either continuously or intermittently.

Colorless heat screens, as set forth above, are particularly adaptable for use with a projection apparatus utilizing commercially known Kodachrome slides or films which have different colored pigments embodied therein and will not alter the color produced by said colored pigments. This is a decided advance in the art of heat screens.

From the foregoing description it will be seen that simple, efficient and economical means and methods have been provided for accomplishing all of the objects and advantages of the invention, particularly that of providing a heat screen having the desirable infra-red or heat absorbing characteristics, exceptionally high transmission of the visible rays and novel means and method of maintaining the temperature of said screen below the point of cracking or breaking during use.

Having described my invention, I claim:

1. A heat screen of relatively thin sheet-like material for projection apparatus, whose analysis may be expressed as $P_2O_5$—52 to 77%; material selected from the group consisting of CaO, BaO, SrO—0.1 to 12%; material from the group consisting of $K_2O$, $Na_2O$, $Li_2O$—0.1 to 10% and material from the group consisting of $Al_2O_3$, BeO and mixtures of $Al_2O_3$ and BeO—5 to 20% and $Fe_3(PO_4)_2.8H_2O$—1 to 10%, which will permit the transmission of approximately 85 to 90% of the visible rays projected on said material and which will permit the transmission of colored light while maintaining substantially unaltered the true color value of said light.

2. A heat screen of relatively thin sheet-like material, for projection apparatus, whose analysis may be expressed as $P_2O_5$—52 to 77%; material selected from the group consisting of CaO, BaO, SrO—0.1 to 12%; material from the group consisting of $K_2O$, $Na_2O$, $Li_2O$—0.1 to 10% and material from the group consisting of $Al_2O_3$, BeO and mixtures of $Al_2O_3$ and BeO—5 to 20% and $Fe_3(PO_4)_2.8H_2O$—1 to 10%, which will permit the transmission of approximately 85 to 90% of the visible rays projected on said material and which will permit the transmission of colored light while maintaining substantially unaltered the true color value of said light, said relatively thin sheet-like material being in the form of separate sections supported in relatively intimate edge to edge relation with each other to produce substantially the effect of a continuous screen.

3. A heat screen of relatively thin sheet-like material for projection apparatus whose analysis may be expressed as $P_2O_5$—52 to 77%; material selected from the group consisting of CaO, BaO, SrO—0.1 to 12%; material from the group consisting of $K_2O$, $Na_2O$, $Li_2O$—0.1 to 10% and material from the group consisting of $Al_2O_3$, BeO and mixtures of $Al_2O_3$ and BeO—5 to 20% and $Fe_3(PO_4)_2.8H_2O$—1 to 10%, which will permit the transmission of approximately 85 to 90% of the visible rays projected on said material and which will permit the transmission of colored light while maintaining substantially unaltered the true color value of said light, said relatively thin sheet-like material being in the form of a disc-like member comprising a plurality of sections supported in edge to edge relation with each other.

4. A heat screen for use with a film projector comprising a relatively thin substantially colorless light transmitting sheet-like member having the property of selectively absorbing infra-red radiations, the material of said sheet-like member being substantially free from silica and containing as a major constituent an oxide of phosphorus to the extent of at least 50% with minor quantities of ingredients selected from alkali and alkaline earth groups and stabilized against chemical attack by means of a stabilizer having the chemical characteristics of an aluminum compound and beryllium compound and mixtures of said aluminum and beryllium compounds and containing a compound of iron in the ferrous condition for infra-red radiation absorption.

5. In a device of the character described the combination of a projection apparatus for projecting a beam of light and having means for moving a film in said beam of light and a heat screen positioned between said beam of light and said film and in spaced relation with said film, said screen comprising a relatively thin substantially colorless light transmitting sheet-like member having the property of selectively absorbing infra-red radiations, the material of said sheet-like member being substantially free from silica and containing as a major constituent an oxide of phosphorus to the extent of at least 50% with minor quantities of ingredients selected from alkali and alkaline earth groups and stabilized against chemical attack by means of a stabilizer having the chemical characteristics of an aluminum compound and beryllium compound and mixtures of said aluminum and beryllium compounds and containing a compound of iron in the ferrous condition for infra-red radiation absorption, means rotatably supporting said screen and means interconnecting said screen with said film moving means to impart a rotary movement to said screen when the film is moved.

6. In a device of the character described the combination of a projection apparatus for projecting a beam of light and having means for moving a film in said beam of light and a heat screen positioned between said beam of light and said film and in spaced relation with said film, said screen comprising a relatively thin substantially colorless light transmitting sheet-like member having the property of selectively absorbing infra-red radiations, the material of said sheet-like member being substantially free from silica and containing as a major constituent an oxide of phosphorus to the extent of at least 50% with minor quantities of ingredients selected from alkali and alkaline earth groups and stabilized against chemical attack by means of a stabilizer having the chemical characteristics of an aluminum compound and beryllium compound and mixtures of said aluminum and beryllium compounds and containing a compound of iron in the ferrous condition for infra-red radiation absorption, means rotatably supporting said screen and means interconnecting said screen with said film moving means, said screen comprising a plurality of separate sections fitted in edge to edge relation with each other and effectively producing a continuous rotatable screen.

EDGAR D. TILLYER.